(12) United States Patent
Furukawa

(10) Patent No.: US 11,024,036 B2
(45) Date of Patent: Jun. 1, 2021

(54) EXTRACTING AN OBJECT REGION FROM AN EXTRACTION TARGET IMAGE INCLUDING A DISPLAY SURFACE

(71) Applicant: CANON KABUSHIKI KAISHA, Tokyo (JP)

(72) Inventor: Takeshi Furukawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 16/137,118

(22) Filed: Sep. 20, 2018

(65) Prior Publication Data
US 2019/0102643 A1    Apr. 4, 2019

(30) Foreign Application Priority Data

Sep. 29, 2017   (JP) .............................. JP2017-191754

(51) Int. Cl.
| | |
|---|---|
| *G06T 7/194* | (2017.01) |
| *G06K 9/20* | (2006.01) |
| *G06T 7/11* | (2017.01) |
| *H04N 5/14* | (2006.01) |
| *G06T 7/254* | (2017.01) |

(52) U.S. Cl.
CPC ............ *G06T 7/194* (2017.01); *G06K 9/2054* (2013.01); *G06T 7/11* (2017.01); *G06T 7/254* (2017.01); *H04N 5/147* (2013.01); *G06T 2207/30221* (2013.01)

(58) Field of Classification Search
CPC . G06T 7/194; G06T 7/254; G06T 7/11; G06T 7/20; G06T 7/215; G06T 7/248; G06T 2207/30221; H04N 5/147; G06K 9/2054; A61B 2034/2065; G08B 13/19604; G08B 13/09606
USPC ........................................................ 382/103
See application file for complete search history.

(56) References Cited

U.S. PATENT DOCUMENTS

| | | | |
|---|---|---|---|
| 5,892,856 A * | 4/1999 | Cooper ..................... | G06T 7/20 348/152 |
| 2008/0181499 A1* | 7/2008 | Yang ......................... | G06T 7/12 382/174 |

FOREIGN PATENT DOCUMENTS

JP        2000-324477 A        11/2000

* cited by examiner

*Primary Examiner* — Casey L Kretzer
(74) *Attorney, Agent, or Firm* — Canon U.S.A., Inc. IP Division

(57) ABSTRACT

An image processing apparatus configured to extract an object region corresponding to a predetermined object from an extraction target image based on image capturing performed by an image capturing apparatus includes an acquisition unit configured to acquire information about an image to be displayed on a display surface located in an image capturing range of the image capturing apparatus, an identification unit configured to identify, as a region from which extraction of the object region is not to be performed, a region corresponding to the display surface in the extraction target image, based on the information acquired by the acquisition unit, and an extraction unit configured to extract the object region formed by part of a plurality of pixels not included in the region identified by the identification unit among a pixel included in the extraction target image.

19 Claims, 5 Drawing Sheets

CAPTURED IMAGE 2000 (TIME T)

REFERENCE REGION

CAPTURED IMAGE 2100 (TIME T+1)

CAPTURED IMAGE 2200 (TIME T+2)

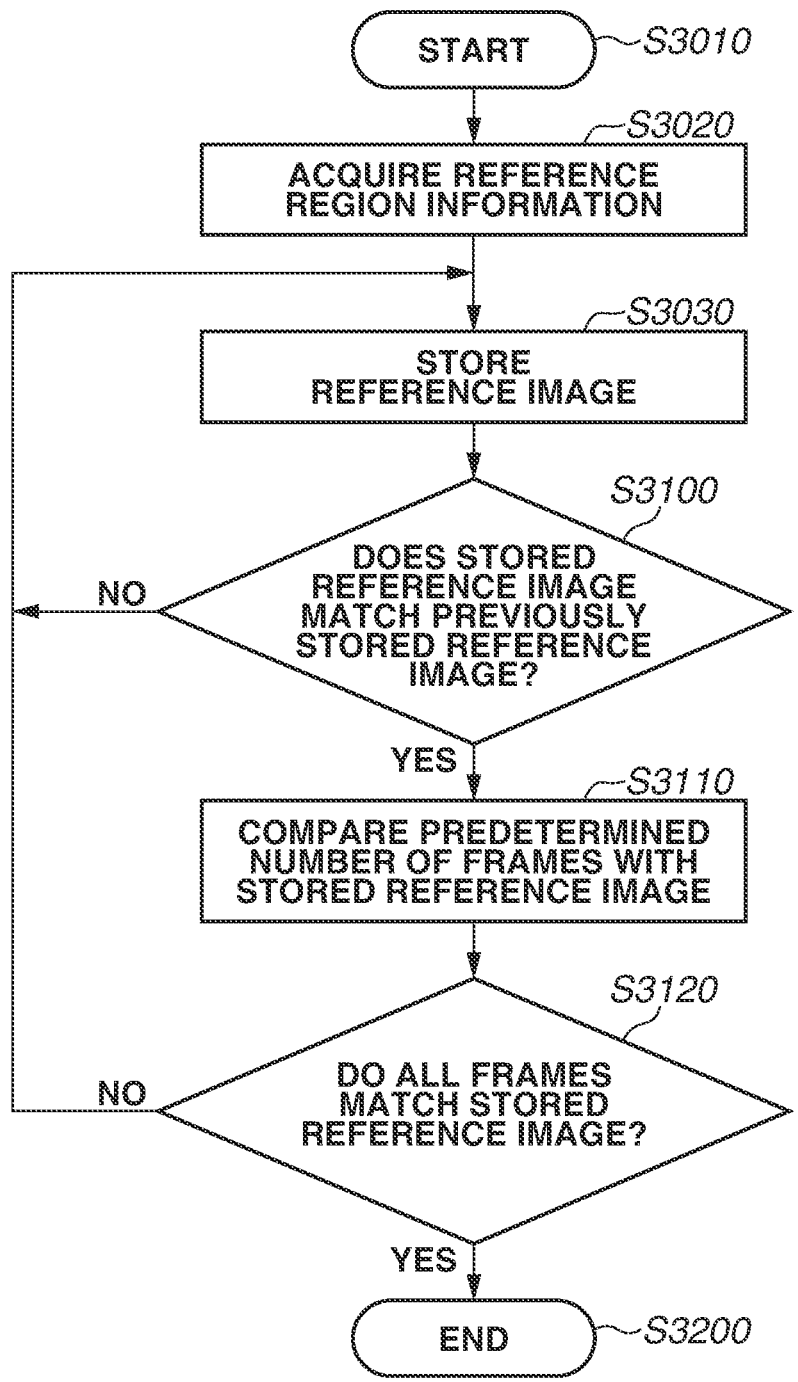

CAPTURED IMAGE 4000

REFERENCE REGION

BACKGROUND IMAGE 4100

FOREGROUND IMAGE 4400

DIFFERENCE REGION IMAGE 4200

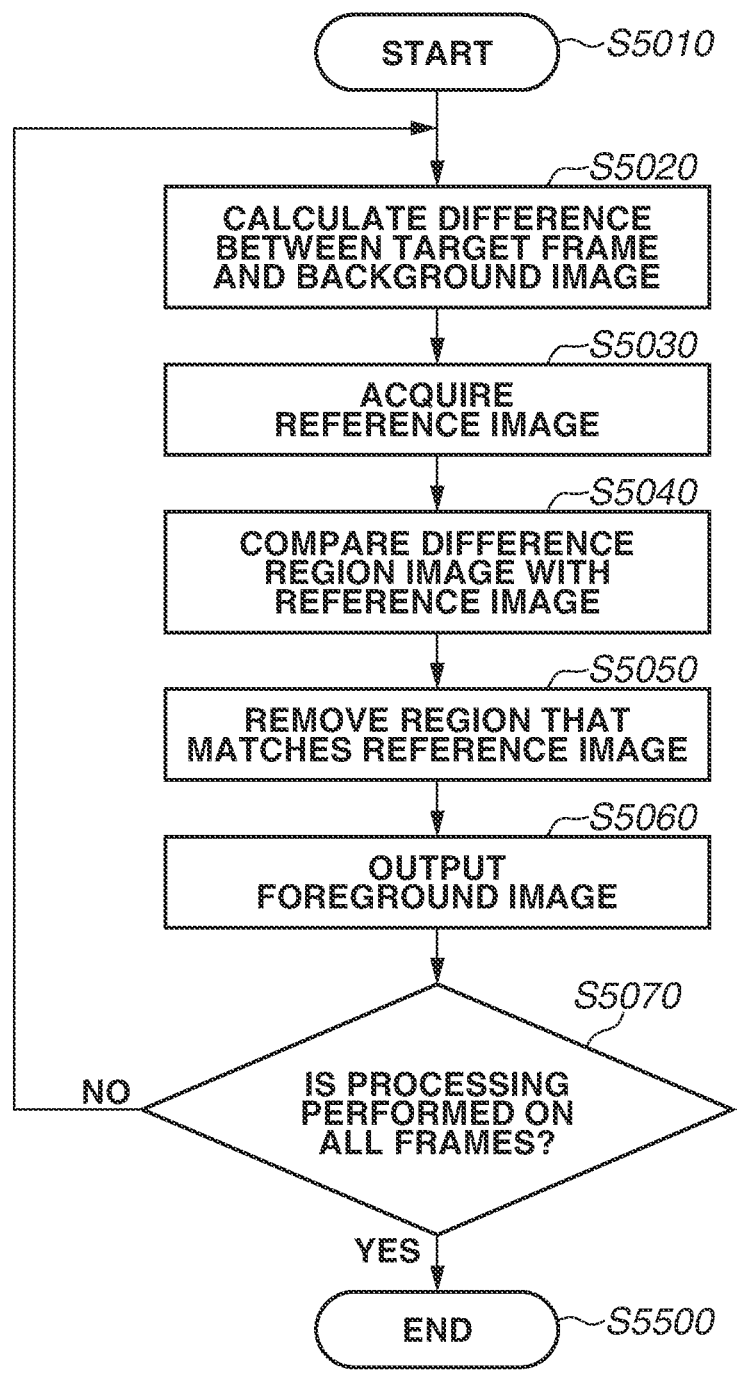

EXTRACTING AN OBJECT REGION FROM AN EXTRACTION TARGET IMAGE INCLUDING A DISPLAY SURFACE

BACKGROUND

Field of the Disclosure

The present disclosure relates to a technique for extracting a specific region from a captured image.

Description of the Related Art

There is a foreground/background separation technique for extracting as a foreground region from a captured image a region corresponding to a predetermined object in the captured image. This technique enables automatic acquisition of, for example, an image of a moving person in captured images. Examples of a foreground/background separation method include a background difference method, in which a foreground region is extracted based on a difference between a captured image and a background image stored in advance, and an inter-frame difference method, in which a foreground region is extracted based on a difference between a plurality of consecutively-captured images.

Japanese Patent Application Laid-Open No. 2000-324477 discusses a technique for preventing erroneous detection of a moving object from a captured image by updating a background image in response to a change in brightness of an image capturing environment in the background difference method.

With the conventional technique, however, both a predetermined object region to be extracted and a region other than the predetermined object region may be extracted without distinction based on a difference between a plurality of images captured at a plurality of different timings. For example, when a captured image contains a moving object to be extracted and a display containing content which changes with time, a region of the moving object and a region of the display are extracted without distinction.

SUMMARY

According to some embodiments, an image processing apparatus configured to extract an object region corresponding to a predetermined object from an extraction target image based on image capturing performed by an image capturing apparatus includes an acquisition unit configured to acquire information about an image to be displayed on a display surface located in an image capturing range of the image capturing apparatus, an identification unit configured to identify, as a region from which extraction of the object region is not to be performed, a region corresponding to the display surface in the extraction target image, based on the information acquired by the acquisition unit, and an extraction unit configured to extract the object region formed by part of a plurality of pixels not included in the region identified by the identification unit among a pixel included in the extraction target image.

Further features of various embodiments will become apparent from the following description of exemplary embodiments with reference to the attached drawings.

BRIEF DESCRIPTION OF THE DRAWINGS

FIG. 3 is a flowchart illustrating a process by which the image processing apparatus acquires a reference image.

FIG. 5 is a flowchart illustrating a process by which the image processing apparatus separates a foreground and a background.

DESCRIPTION OF THE EMBODIMENTS

[System Configuration]

Figure 1A:
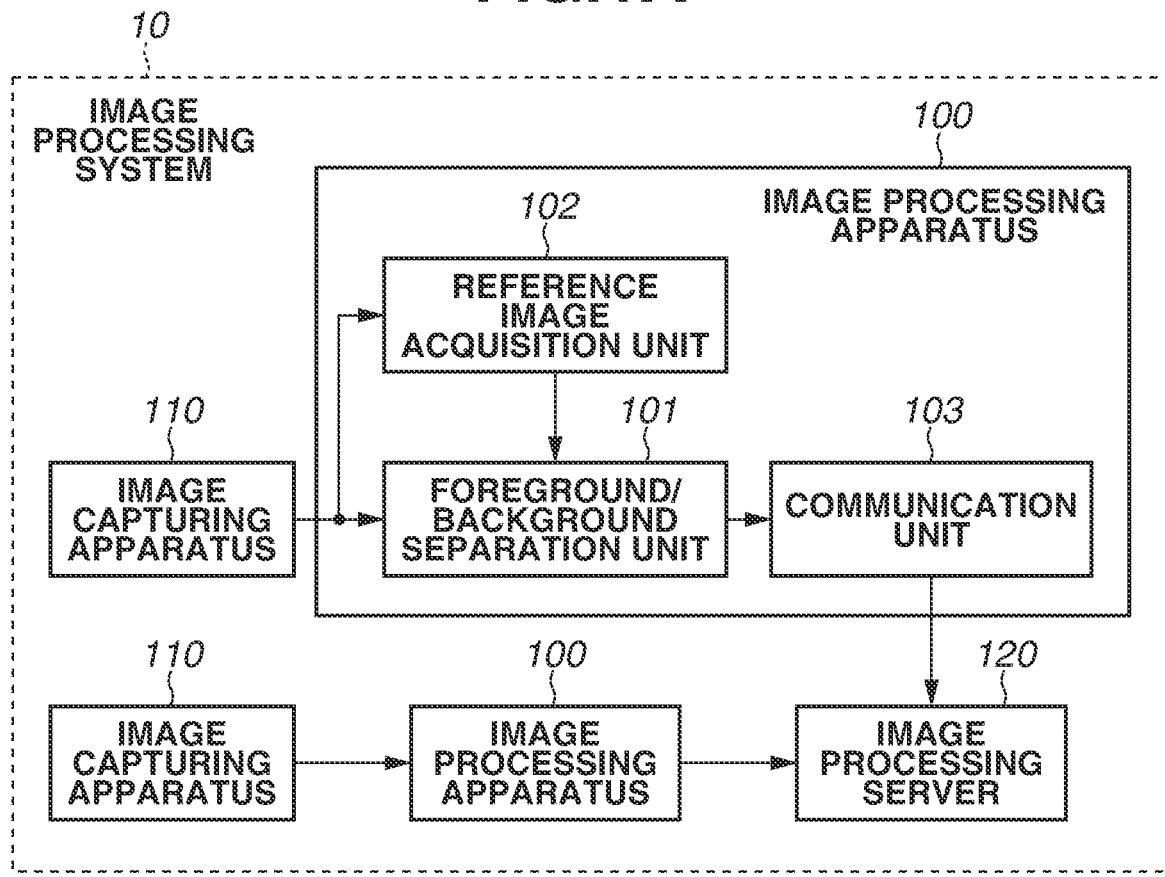
FIG. 1A is a block diagram illustrating a configuration of an image processing system.

FIG. 1A illustrates a schematic configuration of an image processing system 10 according to an exemplary embodiment. The image processing system 10 includes an image processing apparatus 100, an image capturing apparatus 110, and an image processing server 120.

The image capturing apparatus 110 performs image capturing to generate a captured image and inputs the captured image to the image processing apparatus 100. The image capturing apparatus 110 is, for example, a digital video camera including an image signal interface, such as a serial digital interface (SDI), for inputting the captured images. The captured images in the present exemplary embodiment include images having undergone image processing, such as filter processing and resolution conversion processing, after the image capturing.

The image processing apparatus 100 performs image processing on the captured image input from the image capturing apparatus 110 and extracts a foreground region from the captured image to separate the captured image into the foreground region and a background region. This processing will be referred to as foreground/background separation in the present exemplary embodiment. In the present exemplary embodiment, the teem foreground region refers to a region in a captured image that corresponds to a predetermined object, and the term background region refers to a region in the captured image that does not correspond to the predetermined object. For example, the image processing apparatus 100 acquires an image captured in an arena where a soccer game is held, and separates the acquired captured image into a foreground region corresponding to a predetermined object, such as a player, a referee, and a ball, and a background region corresponding to a field area, stands, etc. Then, the image processing apparatus 100 outputs to the image processing server 120 a foreground image based on the foreground region and a background image based on the background region.

Details of the configuration of the image processing apparatus 100 will be described below. The image capturing target of the image capturing apparatus 110 is not limited to soccer games and can be games of other sports such, as rugby or sumo, or can be shows at a stage. Further, the predetermined object to be extracted as a foreground region by the image processing apparatus 100 is not limited to players or balls.

The image processing server 120 performs image processing based on the image input from the image processing apparatus 100. For example, the image processing server 120 acquires a foreground image and a background image from the image processing apparatus 100 via a network cable, generates an image to be displayed, and displays the generated image on a display unit (not illustrated).

In the present exemplary embodiment, the image processing system 10 includes a plurality of image capturing apparatuses 110 and a plurality of image processing apparatuses 100, as illustrated in FIG. 1A. The plurality of image capturing apparatuses 110 is provided in, for example, an arena where images are to be captured, and the image capturing apparatuses capture images from different directions. The plurality of image processing apparatuses 100 acquires the captured images from the corresponding image capturing apparatuses 110 and performs foreground/background separation to output foreground images and background images to the image processing server 120. Specifically, the image processing server 120 acquires a plurality of foreground images and a plurality of background images acquired as a result of the extraction processing on the captured images captured by the plurality of image capturing apparatuses 110. Then, the image processing server 120 generates a virtual viewpoint image containing the predetermined object extracted as the foreground region. While the image processing system 10 in FIG. 1A includes two image capturing apparatuses 110, the image processing system 10 can include three or more image capturing apparatuses 110.

In the present exemplary embodiment, the term "virtual viewpoint image" refers to an image acquired by capturing an image of an object from a virtual viewpoint. In other words, the virtual viewpoint image is an image that represents a field of vision in a designated viewpoint. The virtual viewpoint can be designated, for example, by a user of the image processing server 120 or can be designated automatically based on a result of image analysis, etc. Specifically, the virtual viewpoint image contains a viewpoint image (free viewpoint image) corresponding to a viewpoint designated by the user. Further, the term virtual viewpoint image also refers to an image corresponding to a user-designated viewpoint among a plurality of candidates and an image corresponding to a viewpoint designated automatically by the apparatus. In the present exemplary embodiment, unless otherwise specified, the concept of the term image includes both a moving image and a still image. Specifically, the image processing system 10 in the present exemplary embodiment is capable of performing processing on still images and moving images.

To generate a virtual viewpoint image, the image processing server 120 acquires viewpoint information corresponding to the designated virtual viewpoint. Further, the image processing server 120 generates a three-dimensional model (three-dimensional shape data) of the predetermined object extracted as the foreground region, based on the plurality of foreground images acquired from the plurality of image processing apparatuses 100 corresponding to the plurality of image capturing apparatuses 110 of different image capturing directions. A known method, such as a visual hull method, is used to generate the three-dimensional model. Then, the image processing server 120 performs rendering based on the acquired viewpoint information, the three-dimensional model, and the background image to generate a virtual viewpoint image containing the predetermined object. The three-dimensional shape data to be acquired by the image processing server 120 is not limited to those generated by the visual hull method. Further, the form of the three-dimensional shape data is not particularly limited and, for example, the three-dimensional shape data can be represented by a set of voxels or by a polygon mesh.

The method to be used by the image processing server 120 to generate the virtual viewpoint image is not limited to the method using the three-dimensional model and can be any other applicable method. For example, the image processing server 120 can generate the virtual viewpoint image by performing projective transformation on the acquired foreground image and the acquired background image based on the viewpoint information and then combining the transformed foreground image and the transformed background image together. Further, the processing to be performed by the image processing server 120 is not limited to the processing of generating a virtual viewpoint image and can be, for example, the processing of displaying the acquired foreground image or the processing of outputting the foreground image, the background image, the three-dimensional model, etc. in association with each other to an external database.

As described above with reference to FIG. 1A, the foreground/background separation on the captured images captured by the plurality of image capturing apparatuses 110 is distributed among the plurality of image processing apparatuses 100 in the image processing system 10 in the present exemplary embodiment. In this way, the load on the image processing server 120 is reduced compared with embodiments in which only the image processing server 120 performs the foreground/background separation, so that delays in the processing of the image processing system 10 as a whole are reduced. Further, the configuration of the image processing system 10 is not limited to the above-described configuration. For example, a single image processing apparatus 100 can acquire the captured images from the plurality of image capturing apparatuses 110 and perform foreground/background separation on the respective captured images. Further, the image processing apparatus 100 and the image processing server 120 can be integrated, or the components of the image processing apparatus 100 described below can be distributed among a plurality of apparatuses.

[Configuration of Apparatus]

Figure 1B:
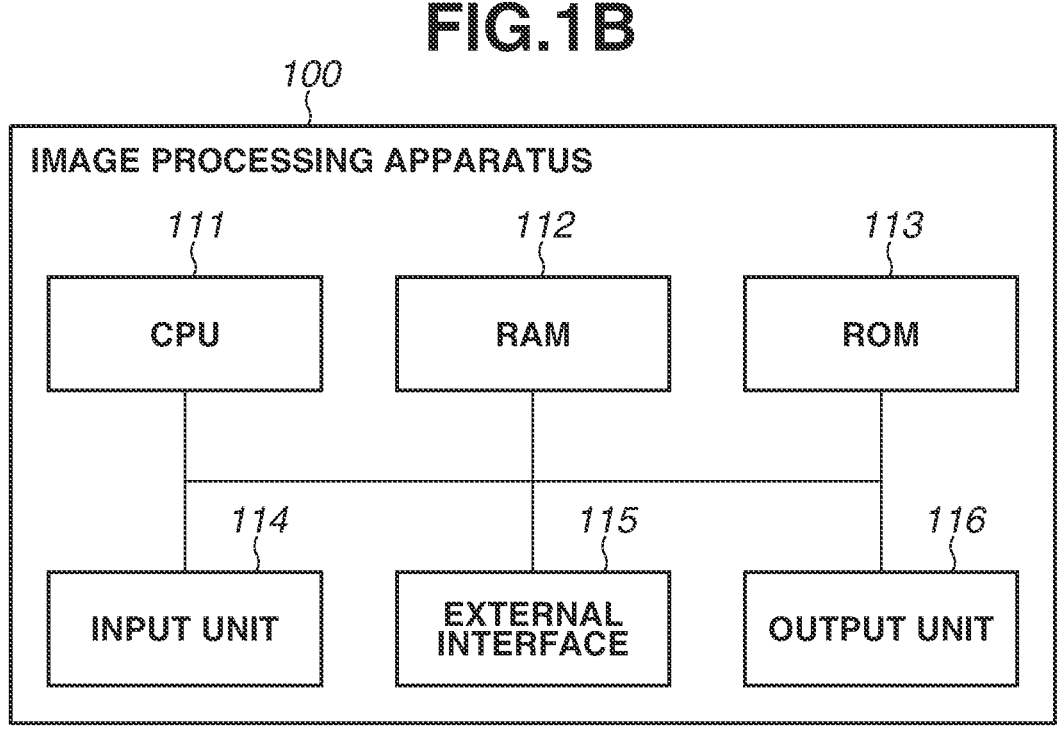
FIG. 1B is a block diagram illustrating a configuration of an image processing apparatus.

FIG. 1B illustrates a hardware configuration of the image processing apparatus 100 according to the present exemplary embodiment. The configuration of the image processing server 120 is similar to that of the image processing apparatus 100. The image processing apparatus 100 includes a central processing unit (CPU) 111, a random-access memory (RAM) 112, a read-only memory (ROM) 113, an input unit 114, an external interface 115, and an output unit 116.

The CPU 111 comprehensively controls the image processing apparatus 100 using computer programs and data stored in the RAM 112 or the ROM 113. Alternatively, the image processing apparatus 100 can include a single piece of or a plurality of pieces of dedicated hardware or graphics processing unit(s) (GPU(s)) different from the CPU 111 and the GPU(s), or the dedicated hardware can perform at least part of the processing of the CPU 111. Examples of dedicated hardware include an application-specific integrated circuit (ASIC), a field-programmable gate array (FPGA), and a digital signal processor (DSP). The RAM 112 temporarily stores a computer program and data read from the ROM 113, data supplied from an external device via the external interface 115, etc. The ROM 113 holds a computer program and data that do not need to be changed.

The input unit 114 includes, for example, an operation button, a jog dial, a touch panel, a keyboard, and a mouse and receives user operations and inputs various instructions to the CPU 111. The external interface 115 performs communication with external apparatuses, such as the image capturing apparatus 110 and the image processing server 120. The communication with the external apparatuses can be wired communication using a local area network (LAN) cable, an SDI cable, etc. or can be wireless communication via an antenna. The output unit 116 includes, for example, the display unit, such as a display, and an audio output unit, such as a speaker. The output unit 116 displays a graphical user interface (GUI) for a user to operate the image processing apparatus 100 and outputs guidance audio.

Next, details of the functional configuration of the image processing apparatus 100 illustrated in FIG. 1A will be described below. The image processing apparatus 100 includes a foreground/background separation unit 101 (hereinafter, separation unit 101), a reference image acquisition unit 102 (hereinafter, acquisition unit 102), and a communication unit 103. The CPU 111 loads a program stored in the ROM 113 into the RAM 112 and executes the program to realize the functional units of the image processing apparatus 100. At least one or some of the functional units of the image processing apparatus 100 in FIG. 1A can be realized by a single piece of or a plurality of pieces of dedicated hardware or GPU(s) different from the CPU 111.

The separation unit 101 performs foreground/background separation on the captured image input from the image capturing apparatus 110 and outputs the foreground image and the background image to the communication unit 103. In the present exemplary embodiment, the separation unit 101 uses the background difference method to extract the foreground region included in the captured image. In the background difference method, a captured image containing an object to be extracted is compared with a background image that is stored in advance and that does not contain the object, and regions having a pixel value difference greater than a threshold value are extracted. For example, a captured image captured during a game when a player to be extracted is within an age capturing range is compared with a background image captured before the game when the player is not within the image capturing range, and regions in the captured image that correspond to the player are extracted. The method used by the separation unit 101 to perform foreground/background separation is not limited to the above-described method and, for example, the inter-frame difference method can be used. In the inter-frame difference method, regions are extracted based on a difference between a plurality of captured images captured consecutively by the same image capturing apparatus.

Figure 4A:
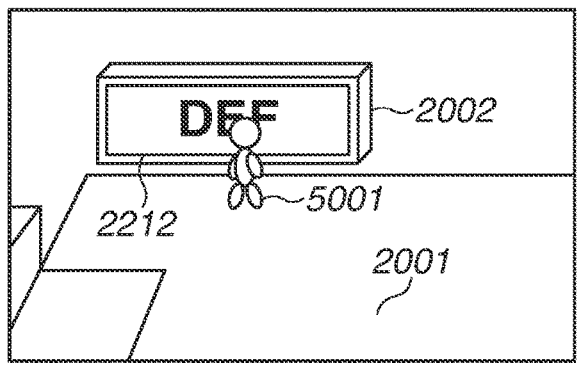
FIGS. 4A, 4B, 4C, 4D, and 4E illustrate a background image and a foreground image in an exemplary embodiment.
Figure 4D:
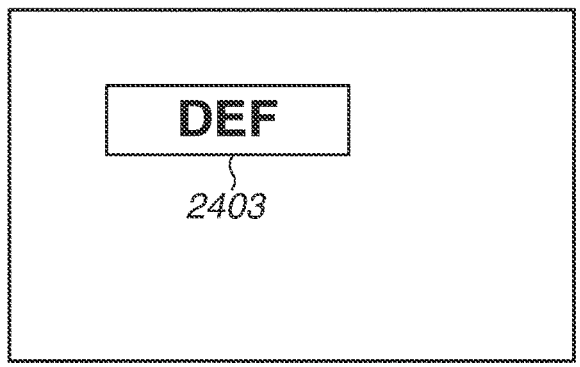

In the case where the separation unit 101 uses the conventional background difference method without modification, it may be impossible to exclusively extract the regions of the object to be extracted. The following discusses, as an example, a case in which a region where a player appears is to be extracted from a captured image of a soccer game held in an arena. FIG. 4A illustrates an example of a captured image 4000, which is a extraction processing target. The captured image 4000 includes a player 5001, a field 2001, and a display 2002 which is disposed at the side of the field 2001 and displays an advertisement. The display 2002 displays an image that changes with time (e.g., a moving image that displays a predetermined advertisement). While the image to be displayed on the display 2002 is an advertisement image in the present exemplary embodiment, the content of the image to be displayed is not limited to the foregoing. For example, the display 2002 can display a captured image of an arena, information about a game held in an arena, etc.

Figure 4B:
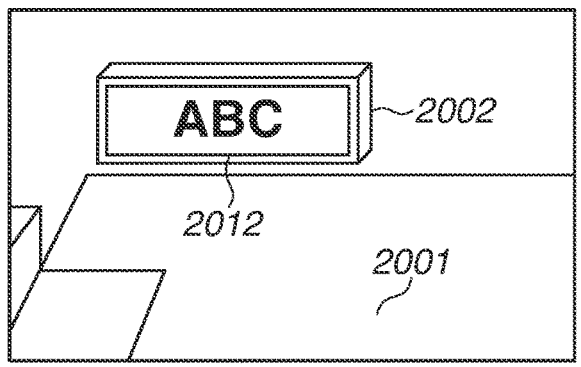
Figure 4E:
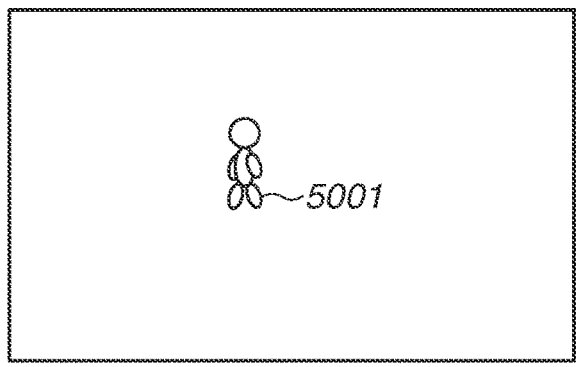
Figure 4C:
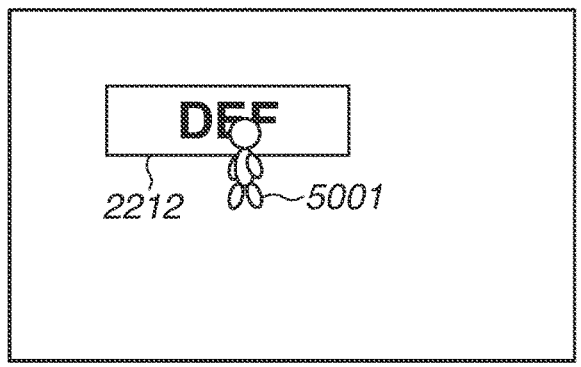

In this case, if the background difference method is executed on the captured image 4000 using a previously-captured image as illustrated in FIG. 4B as a background image 4100, a difference region image 4200 as illustrated in FIG. 4C is obtained. In the present exemplary embodiment, the difference region image 4200 is specifically an image formed by pixels having a greater pixel value difference (the absolute value of the difference) than the corresponding pixel in the background image 4100 among the pixels in the captured image 4000. The difference region image 4200 can be any image of regions where the difference between the captured image 4000 and the background image 4100 is greater than or equal to the threshold value, and the difference region image 4200 is not limited to those identified by calculating a pixel value difference for each pixel. For example, the difference between the captured image 4000 and the background image 4100 can be calculated for each block formed by a plurality of pixels. The difference between corresponding blocks in a plurality of images can be calculated using the mean value of pixel values in the blocks, the mode value of the pixel values in the blocks, etc.

As illustrated in FIG. 4C, if the conventional background difference method is executed, the region corresponding to the display surface of the display 2002 is also extracted together with a region corresponding to a player 5001. If the regions are extracted equally, a virtual viewpoint image generated by the image processing server 120 based on the extraction result can have a low image quality. For example, in the case where the image processing apparatus 100 generates a difference region image from each of a plurality of captured images of the field 2001 and its vicinities that is captured from the plurality of directions by the plurality of image capturing apparatuses 110, the player 5001 is included in every one of the difference region images. Meanwhile, the display surface of the display 2002 is not included in images captured from the back of the display 2002 and is thus not included in a difference region image generated from the captured images. It is difficult to accurately associate a pixel of the difference region image containing both the player 5001 and the display surface with a pixel of the difference region image containing only the player 5001. Thus, if the image processing server 120 generates a three-dimensional model of the player 5001 based on the difference region images, the generated model has low accuracy. As a result, the image quality of the virtual viewpoint image is also decreased.

Thus, the image processing apparatus 100 in the present exemplary embodiment includes the acquisition unit 102 to acquire a foreground image 4400 which contains the region corresponding to the player 5001 but does not contain the region corresponding to the display surface of the display 2002, as illustrated in FIG. 4E. The acquisition unit 102 acquires a reference image corresponding to a background change region in a captured image. The term background change region refers to a region that is not to be extracted as a foreground region. More specifically, the background change region is a region that is to be identified as a background region but changes with time. In the above-described example illustrated in FIGS. 4A to 4E, the region corresponding to the display surface of the display 2002 is a background change region, and advertisement images 2212 and 2012, etc. displayed on the display surface are acquired as a reference image by the acquisition unit 102. Specifically, the acquisition unit 102 acquires a reference image relating to a plurality of images displayed at a plurality of different time points by the display 2002 located within the image capturing range of the image capturing apparatus 110. A reference image acquisition method will be described below.

The acquisition unit 102 provides the acquired reference image to the separation unit 101. Then, the separation unit 101 performs foreground/background separation on the captured image acquired from the image capturing apparatus 110 excluding the portion that matches the reference image provided by the acquisition unit 102, thereby extracting the region of the object to be extracted as a foreground region. Details of the foreground/background separation performed by the separation unit 101 will be described below.

The communication unit 103 transmits, to the image processing server 120, the foreground image and the background image input from the separation unit 101. The communication unit 103 includes, for example, a LAN card provided with a high-speed serial interface, such as a Peripheral Component Interconnect (PCI) Express interface.

[Acquisition of Reference Image]

Figure 2A:
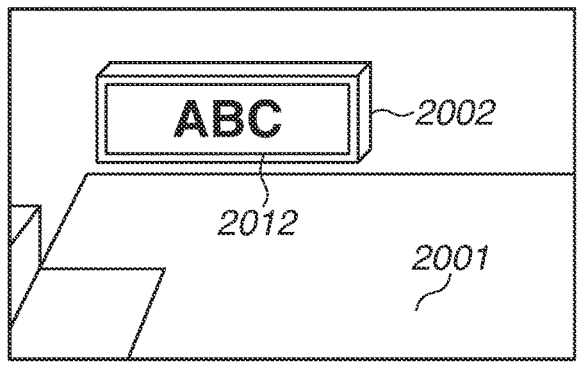
FIGS. 2A, 2B, 2C, 2D, and 2E illustrate a change in a captured image in an exemplary embodiment.
Figure 2D:
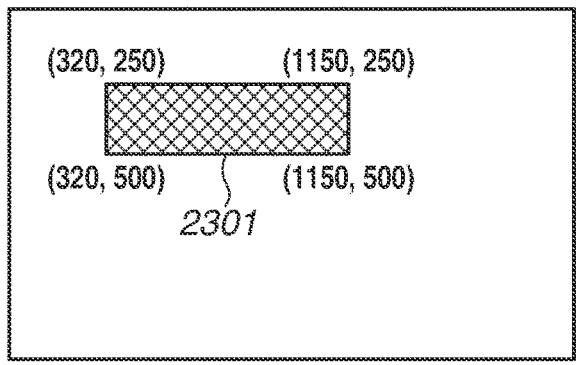
Figure 2B:
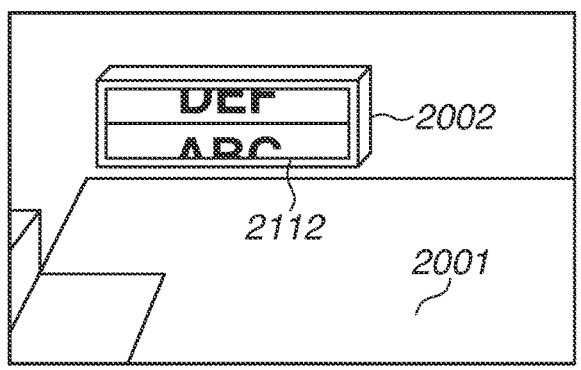

Next, the reference image acquisition will be described below. FIGS. 2A to 2C illustrate an example of images captured by the image capturing apparatus 110. FIG. 2A illustrates a captured image 2000 captured at time T by the image capturing apparatus 110. FIG. 2B illustrates a captured image 2100 captured at time T+1 by the image capturing apparatus 110. FIG. 2C illustrates a captured image 2200 captured at time T±2 by the image capturing apparatus 110.

The image capturing target is a soccer game, and the captured image 2000 includes the field 2001 and the display 2002 for displaying advertisements. The captured images 2000 to 2200 are images captured in the situation in which there is no person, such as a player, in the image capturing range, and the image capturing range includes the display surface of the display 2002, such as the situation in which preparation for a game is conducted in a stadium. During this image capturing, a rehearsal for a display of advertisements is conducted, and the image displayed on the display 2002 changes.

The display 2002 for displaying advertisements displays the advertisement image 2012 at time T, whereas the display 2002 displays an advertisement image 2112 at time T+1. For example, the advertisement image 2112 is an image that shows a change from the advertisement image 2012 to the next advertisement image 2212 with an image effect of vertical scrolling.

Figure 2E:
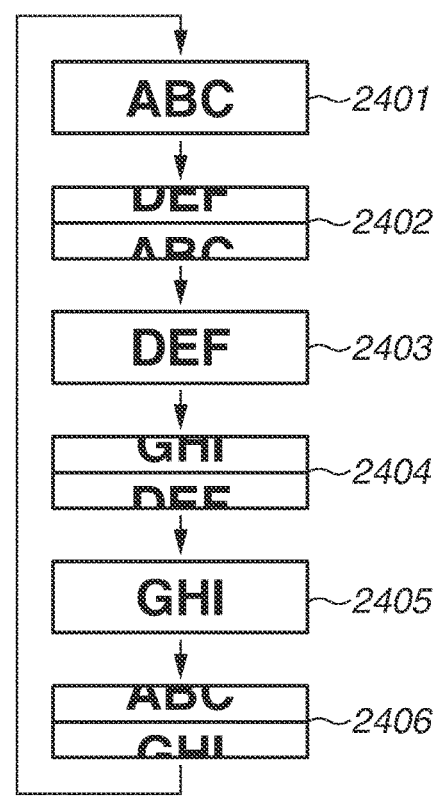
Figure 2C:
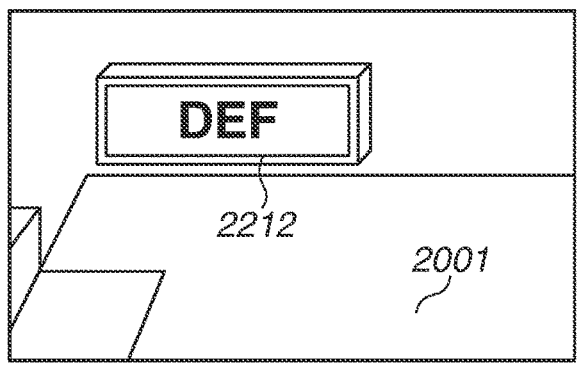

As illustrated in FIG. 2E, the display 2002 periodically displays a plurality of images, images 2401 to 2406. Specifically, the display 2002 displays the image 2401 at time 6$n$ ($n$ is an integer). Further, the display 2002 displays the images 2402, 2403, 2404, 2405, and 2406 at time 6$n$+1, 6$n$+2, 6$n$+3, 6$n$+4, and 6$n$+5, respectively. Then, after the image 2406 is displayed at time 6$n$+5, the display 2002 displays the image 2401 again at the next time point. The acquisition unit 102 acquires, as a reference image, the advertisement images displayed by the display 2002.

Next, a process by which the acquisition unit 102 acquires a reference image will be described below with reference to FIG. 3. In S3010, the process illustrated in FIG. 3 is started at the timing at which the image processing apparatus 100 acquires a captured image from the image capturing apparatus 110 in a reference image acquisition mode. The timing to start the process illustrated in FIG. 3, however, is not limited to the foregoing. The mode of the image processing apparatus 100 is set by, for example, a user operation. Specifically, an image capturing period for acquiring a reference image is designated in response to a predetermined operation by the user so that the image processing apparatus 100 is set to the reference image acquisition mode. The image capturing period to be designated is, for example, a period during which the image capturing range of the image capturing apparatus 110 does not contain a predetermined object, such as a player (e.g., during a rehearsal before a start of a game in an arena). The user can perform an operation at the start and at the end of the image capturing period.

While the captured image to be input from the image capturing apparatus 110 to the image processing apparatus 100 is frames of a moving image in the following description, the captured image to be input can be a plurality of still images captured at a plurality of time points. The process illustrated in FIG. 3 can be performed in real time concurrently with the image capturing performed by the image capturing apparatus 110 or can be performed based on accumulated captured images after the image capturing. In any of the cases, the process illustrated in FIG. 3 is executed based on a captured image that is captured in the situation where the image capturing range includes the display surface of the display 2002 and does not include anything that covers the display surface (e.g., a situation before a start of a game when the player 5001 is not in the field 2001).

The CPU 111 loads a program stored in the ROM 113 into the RAM 112 and executes the program to realize the process illustrated in FIG. 3. Alternatively, at least part of the process illustrated in FIG. 3 can be realized by a single piece of, or a plurality of pieces of, dedicated hardware or GPU(s) different from the CPU 111.

In S3020, the acquisition unit 102 acquires information indicating a predetermined region (hereinafter, reference region) that is a candidate background change region and is to be a reference image acquisition target. The reference region is, for example, a region in the captured image that corresponds to the display 2002. In the present exemplary embodiment, the reference region is identified based on user designation. For example, the user operates the image processing apparatus 100 while viewing an image captured by the image capturing apparatus 110 and designates the coordinates of a reference region in the captured image so that the reference region is identified. Then, the acquisition unit 102 acquires the user-designated coordinates as the information indicating the identified reference region.

The reference region identification method is not limited to the foregoing. For example, the image processing apparatus 100 can acquire the information indicating the coordinates of the reference region from an external apparatus. Further, for example, the image processing apparatus 100 can acquire a three-dimensional model of a background containing the field 2001, etc. and identify a reference region based on the model. Further, for example, the image processing apparatus 100 can hold an image representing the display 2002 and/or a marker image displayed on the display 2002 and compare the images with the captured image to identify the reference region corresponding to the display 2002.

Further, the reference region can be identified based on, for example, a difference between a plurality of captured images captured at a plurality of different timings under the situation in which the predetermined object, such as the player 5001, to be extracted as a foreground region is not included in the image capturing range of the image capturing apparatus 110. Specifically, by identifying a region in a plurality of captured images, such as the captured images 2000 to 2200 in FIG. 2, and having a pixel value difference of the corresponding pixel of a threshold value or more, the reference region corresponding to the display surface of the display 2002 can be identified. In this way, the burden for the user to designate the reference region is reduced.

FIG. 2D illustrates an example of information which indicates a reference region. In FIG. 2D, a reference region 2301 is a rectangular region, and the coordinates (320, 250), (230, 500), (1150, 250), and (1150, 500) of the vertexes of the rectangle are the information indicating the reference region. The shape of the reference region is not limited to the rectangles, and the information indicating the reference region is not limited to the coordinates of the vertexes.

In S3030, the acquisition unit 102 determines a target frame from the frames of the moving image acquired from the image capturing apparatus 110 in the reference image acquisition mode. Then, the acquisition unit 102 stores, as a reference image, an image of a portion of the target frame that corresponds to the reference region indicated by the information acquired in S3020. For example, the acquisition unit 102 stores, as a reference image, an image 2401 which is the image of the portion of the captured image 2000 that corresponds to the reference region 2301.

In S3100, the acquisition unit 102 determines whether the reference image stored in S3030 matches a previously-stored reference image. If the acquisition unit 102 performs the processing of S3100 for the first time in the process illustrated in FIG. 3, since there is no previously-stored reference image, the acquisition unit 102 determines that the reference image stored in S3030 does not match a previously-stored reference image. If the acquisition unit 102 determines that the reference image stored in S3030 does not match a previously-stored reference image (NO in S3100), the target frame is changed to a frame of a time point after the time point of the target frame, and the processing returns to S3030.

The processing returns to S3030, and the acquisition unit 102 stores, as a new reference image, for example, an image 2402 which is an image of the portion of the captured image 2100 that corresponds to the reference region 2301. Then, in S3100, the acquisition unit 102 compares the image 2402, which is the stored new reference image, with the image 2401, which is a previously-stored reference image, and determines whether the reference images match.

Whether reference images match is determined by, for example, calculating the mean squared error of pixel values. Specifically, the acquisition unit 102 calculates the squared errors of pixel values of corresponding pixels of the two comparison target reference images and calculates a mean value for all the pixels in the reference images. If the mean squared error calculated in this way is less than a threshold value, the acquisition unit 102 determines that the two comparison target reference images match. The method for the determination of whether the reference images match, however, is not limited to the foregoing, and the determination can be performed using, for example, a method such as pattern matching using a feature amount of a reference image that is calculated by main component analysis.

If the acquisition unit 102 determines that the comparison target reference images do not match, the target frame is changed to the next frame, and the processing returns again to S3030. In this way, S3030 and S3100 are repeated until a new stored reference image matches a previously-stored reference image. As a result, the acquisition unit 102 stores, for example, the images 2401 to 2406 illustrated in FIG. 2E as a plurality of reference images. The acquisition unit 102 may acquire part of the images 2401 to 2406 from the captured image in S3030 and acquire the rest by interpolation processing. For example, the acquisition unit 102 may generate the image 2402 based on the images 2401 and 2403 acquired from the captured image and store the image 2402 as a reference image. Use of the interpolation processing simplifies the process illustrated in FIG. 3 and makes it possible to complete the process in a short time.

In the present exemplary embodiment, the image displayed on the display 2002 periodically changes. Specifically, the display 2002 displays the image 2401 again after displaying the image 2406. If the acquisition unit 102 acquires the image 2401 again as a reference image in S3030, then in subsequent S3100, the acquisition unit 102 determines that the newly-stored reference image matches the previously-stored reference image. If the acquisition unit 102 determines that the newly-stored reference image matches the previously-stored reference image (YES in S3100), the processing proceeds to S3110.

In S3110, the acquisition unit 102 sequentially updates the target frame and compares an image of a portion of each of a predetermined number of frames that corresponds to the reference region with the stored reference image. The predetermined number is set to a number that is greater than or equal to the number of frames corresponding to the cycle of the change of the displayed image on the display 2002. Whether all the images to be displayed by the display 2002 are stored as a reference image can be determined by the image comparison in S3110. The predetermined number can be set based on a user operation or can be set automatically based on, for example, the number of reference images stored in S3030.

In S3120, the acquisition unit 102 determines whether to end the process illustrated in FIG. 3 based on the result of image comparison performed in S3110. Specifically, if the image of the portion of each one of the target frames in S3110 that corresponds to the reference region matches the stored reference image (YES in S3120), the acquisition unit 102 determines that all the images to be displayed on the display 2002 are stored as a reference image, and the process illustrated in FIG. 3 is ended. On the other hand, if there is a frame with the image of the portion that corresponds to the reference region that does not match the stored reference image (NO in S3120), the processing returns to S3030, and the reference image accumulation is performed again.

As described above, the acquisition unit 102 acquires, as a reference image, an image that corresponds to the display surface of the display 2002 and is based on image capturing performed at a plurality of time points. In this way, the separation unit 101 can identify, in the foreground/background separation described below, the background change region corresponding to the display surface of the display 2002 displaying an image to be changed with time.

The image to be displayed on the display 2002 is not limited to the image that is periodically changed and can be a plurality of images to be displayed randomly. Even in this case, the acquisition unit 102 can store many of the images to be displayed on the display 2002 as a reference image by increasing the number of frames to be compared in S3110. Further, in the case where, for example, the display 2002 repeatedly displays and hides an image of a single pattern, the acquisition unit 102 can acquire a reference image corresponding to the single pattern, and the separation unit 101 can use the reference image to identify the background change region.

[Foreground/Background Separation]

Next, the foreground/background separation performed by the separation unit 101 will be described below. FIG. 4A illustrates an example of the captured image 4000 captured by the image capturing apparatus 110 and input to the separation unit 101. The captured image 4000 is different from the images captured to acquire the reference images described above and is an image captured in the situation in which a game is held in a stadium. Thus, the captured image 4000 is an image captured in the situation in which the player 5001 is on the field 2001 within the image capturing range and the image capturing range includes the display surface of the display 2002. The image displayed on the display 2002 changes as in the time of rehearsal. The separation unit 101 extracts, by foreground/background separation, a region of the player 5001 that is included in the captured image 4000.

The operation of foreground/background separation by the separation unit 101 will be described below with reference to FIG. 5. In S5010, the process illustrated in FIG. 5 is started at the timing at which the image processing apparatus 100 acquires the captured image from the image capturing apparatus 110 in a foreground/background separation mode in which the foreground/background separation is performed. The timing to start the process illustrated in FIG. 5, however, is not limited to the foregoing. The mode of the image processing apparatus 100 is set by, for example, a user operation. Specifically, an image capturing period of capturing a foreground/background separation target image for detecting an object region is designated in response to a predetermined operation by the user so that the image processing apparatus 100 is set to the foreground/background separation mode. The image capturing period to be designated is, for example, a period during which the image capturing range of the image capturing apparatus 110 contains a predetermined object, such as a player (e.g., during a game in an arena). The image capturing period for foreground/background separation is designated by an operation different from the operation of designating the image capturing period for the reference image acquisition described above with reference to FIG. 3.

The process illustrated in FIG. 5 can be performed in real time concurrently with the image capturing performed by the image capturing apparatus 110 or can be performed after the image capturing based on accumulated captured images. In any case, the process illustrated in FIG. 5 is executed based on a captured image that is captured in the situation in which a predetermined object to be extracted is within the image capturing range of the image capturing apparatus 110 (e.g., during a game in which the player 5001 is in the field 2001).

The CPU 111 loads a program stored in the ROM 113 into the RAM 112 and executes the program to realize the process illustrated in FIG. 5. Alternatively, at least part of the process illustrated in FIG. 5 can be realized by a single piece of, or a plurality of pieces of, dedicated hardware or GPU(s) different from the CPU 111.

In S5020, the separation unit 101 determines a target frame from the frames of the moving image acquired from the image capturing apparatus 110 in the foreground/background separation mode and calculates the difference between the captured image 4000, which is the target frame, and the background image 4100. The target frame is an image (extraction target image) from which a foreground region is to be extracted, and in the cases where S5020 is executed for the first time in the process illustrated in FIG. 5, for example, the first frame of the acquired moving image is determined as the target frame. The background image 4100 is an image that is based on image capturing performed by the image capturing apparatus 110 at a different timing from the captured image 4000 as the extraction target image. Further, the background image 4100 is stored in advance and does not contain a predetermined object to be extracted. In the case where the processing of S5020 is executed for the first time, for example, a captured image as illustrated in FIG. 4B, which is captured before a game, is used as the background image 4100. The difference region image 4200 as illustrated in FIG. 4C can be obtained by calculating the difference between the captured image 4000 and the background image 4100. The difference region image 4200 is specifically an image formed by pixels having a pixel value difference greater than or equal to a threshold value from the corresponding pixel in the background image 4100 among the pixels in the captured image 4000. The difference region image 4200 contains the advertisement image 2212 to be displayed on the display surface of the display 2002 besides the player 5001 to be extracted as a foreground region.

In S5030, the separation unit 101 acquires the reference images stored in the process described above with reference to FIG. 3 from the acquisition unit 102. As described above, the stored reference images are, for example, the images 2401 to 2406 as illustrated in FIG. 2E which correspond to the plurality of images to be displayed on the display 2002.

In S5040, the separation unit 101 compares the partial image of the portion of the difference region image 4200 that corresponds to the reference region to be a candidate background change region with the reference images acquired in S5030. Specifically, the separation unit 101 compares each of the plurality of acquired reference images with the partial image to calculate the mean squared errors of the pixel values. Then, the separation unit 101 selects the reference image with the least mean squared error. For example, in the case where the partial image is the advertisement image 2212 as illustrated in FIG. 4C, the image 2403 is selected as the reference image corresponding to the partial image among the images 2401 to 2406 which are the plurality of acquired reference images.

In S5050, the separation unit 101 identifies, as a background change region, the region of the captured image 4000 that corresponds to the display surface of the display 2002, by using the image 2403 selected as the reference image in S5040. Specifically, the separation unit 101 identifies, as the region corresponding to the display surface, the region formed by pixels having a pixel value difference (the absolute value of the difference) less than the predetermined value from the corresponding pixel in the image 2403 among the pixels included in the reference region in the captured image 4000.

In the captured image 4000, the display surface of the display 2002 is partially covered by the player 5001. Meanwhile, the image 2403, which is a reference image, is an image that corresponds to the entire advertisement image 2212 displayed on the display surface of the display 2002. Thus, the region of the captured image 4000 where the display surface appears has a pixel value difference less than the predetermined value from the image 2403 and is, therefore, identified as a background change region. On the other hand, the region of the captured image 4000 where the player 5001 appears has a pixel value difference greater than or equal to the predetermined value from the image 2403 and is, therefore, not identified as a background change region. Specifically, the method as described above is capable of identifying, as a background change region, the region in the captured image 4000 that corresponds to the portion of the display surface of the display 2002 that is not covered.

The above-described predetermined value can be set based on a user operation or can be set automatically based on, for example, the environmental condition at the time of capturing the captured image 4000 by the image capturing apparatus 110. Further, the method of identifying a background change region in the captured image 4000 is not limited to the method in which the pixel values of the captured image 4000 and the reference image are directly compared. For example, the identification of a background change region in the captured image 4000 can be performed by pattern matching using a feature amount of a reference image which is calculated by a method such as main component analysis or machine learning using a plurality of reference images. Use of such a method makes it possible to improve the accuracy of identifying a background change region even when the light source state of the image capturing range during the capturing of the captured image 4000 is different from the light source state during the acquisition of the reference image. Further, the capacity of a storage area for storing the reference images in the image processing apparatus 100 and the processing amount of the comparison of pixel values may be reduced.

Next, the separation unit 101 removes the region that overlaps the background change region from the difference region image 4200 to generate the foreground image 4400 as illustrated in FIG. 4E. Specifically, the separation unit 101 extracts, as a foreground region, the region formed of pixels that are not included in the identified background change region among the pixels included in the difference region image 4200. The foreground image 4400 does not include the advertisement image 2212 displayed on the display surface of the display 2002 and includes only the player 5001.

In S5060, the separation unit 101 outputs the image (foreground image 4400) of the foreground region extracted in S5050 to the image processing server 120.

In S5060, a foreground/background separation unit 1010 outputs the foreground image 4400 in FIG. 4E which is derived in S5060 and S6050 to an external communication unit 1200 of an exemplary embodiment.

When the processing of S5060 ends, the processing proceeds to S5070, and the separation unit 101 determines whether the processing of S5020 to S5060 is performed on all the frames of the moving image acquired from the image capturing apparatus 110 in the foreground/background separation mode. If the separation unit 101 determines that the processing is not performed on all the frames (NO in S5070), the separation unit 101 changes the target frame to the next frame, and the processing returns to S5020. On the other hand, if the separation unit 101 determines that the processing is performed on all the frames (YES in S5070), then in S5500, the process illustrated in FIG. 5 is ended.

In the foregoing description with reference to FIG. 5, the separation unit 101 extracts the foreground region by removing the background change region from the region formed by pixels having a pixel value difference greater than or equal to the threshold value from the corresponding pixel in the background image 4100 among the pixels in the captured image 4000. The method, however, is not limited to the foregoing, and the separation unit 101 can extract the foreground region by determining the difference between the partial image of the captured image 4000 that is formed by pixels not included in the background change region and the region in the background image 4100 that corresponds to the partial image. By this method, the number of pixels for which the pixel value difference is to be calculated is reduced, so that the processing load on the image processing apparatus 100 is reduced. In any of the methods, the foreground region formed by part of the plurality of pixels (pixels of the region of the captured image 400 excluding the background change region) not included in the background change region is extracted from the captured image 4000 based on the difference between the captured image 4000 and the background image 4100.

In the present exemplary embodiment, as described above with reference to FIG. 3, the acquisition unit 102 acquires, as a reference image, a portion of the captured image captured by the image capturing apparatus 110 before capturing the captured image 4000 from which a foreground region is to be extracted. The reference image acquisition method, however, is not limited to the foregoing. For example, in the cases in which the processing of extracting a foreground region from the captured image 4000 captured during a game is performed after the game, a portion of the captured image captured after the game can be acquired as a reference image. Further, for example, the acquisition unit 102 can acquire image data for use in displaying an image on the display surface by the display 2002 from an external device and store, as a reference image, the image data and data obtained by performing geometric transformation on the image data. In this case, the acquisition unit 102 can acquire, in advance, image data on images of a plurality of patterns to be displayed on the display 2002 or can acquire in real time an image being displayed on the display 2002. In the cases in which image data for use in displaying on the display surface is acquirable, use of the above-described methods reduces the burden of image capturing for acquiring a reference image and reduces the processing amount of the image processing apparatus 100 in the process illustrated in FIG. 3.

Further, the information about the images to be displayed on the display 2002 is not limited to the reference images described above, and the acquisition unit 102 can acquire, for example, color information indicating colors contained in the images to be displayed on the display surface. Then, the separation unit 101 can identify, as a background change region, a pixel having a pixel value difference less than a threshold value from a red-green-blue (RGB) value specified by the color information acquired from the acquisition unit 102 among the pixels included in the reference region in the captured image. In the case where the difference between the colors included in the images to be displayed on the display 2002 and the colors included in the predetermined object to be extracted as a foreground region is large, use of the methods described above makes it possible to identify a background change region by simpler processing.

As described above, the image processing apparatus 100 according to the present exemplary embodiment extracts an object region (foreground region) corresponding to a predetermined object from an image based on image capturing performed by the image capturing apparatus 110. Specifically, the image processing apparatus 100 acquires information about images to be displayed on the display 2002 located within the image capturing range of the image capturing apparatus 110. Further, the image processing apparatus 100 identifies, as a region from which an object region is not to be extracted, the region corresponding to the display surface of the display 2002 in the extraction target image based on image capturing performed by the image capturing apparatus 110, based on the acquired information. Then, the image processing apparatus 100 extracts the object region in the extraction target image based on the difference between the extraction target image and another image based on image capturing performed by the image capturing apparatus 110 at a timing different from the image capturing timing of the extraction target image. The extracted object region is formed by pixels not included in the region identified as the region from which an object region is not to be extracted.

The foregoing configuration makes it possible to extract a specific region among regions formed by differences among a plurality of images. For example, in a case where a captured image includes a moving predetermined object and a display on which a moving image is to be displayed, the image processing apparatus 100 is capable of extracting only the region of the predetermined object. Especially, even if the predetermined object and the display overlap in the captured image, the image processing apparatus 100 is able to extract only the region of the predetermined object. Thus, the image processing server 120 which acquires the extraction result from the image processing apparatus 100 is able to accurately identify the shape of the predetermined object to generate a virtual viewpoint image including the object with high image quality.

In the present exemplary embodiment, the description has been given focusing on a case where the region in the captured image that corresponds to the display surface of the display 2002 is detected as a background change region and the region corresponding to the player 5001 is extracted as a foreground region. The background change region and the foreground region, however, are not limited to those described above. For example, an object such as a ball can be extracted as a foreground region. Further, a display surface onto which an image is to be projected by a projector can be detected as a background change region. Further, a region of an object changing periodically or an object changing in a predetermined pattern, for example a display surface of a panel painted for advertisement, can be detected as a background change region.

Further, in a modified example of the present exemplary embodiment, the image processing apparatus 100 can generate a plurality of difference region images using a plurality of background images with respect to a single captured image and extract a foreground region based on the plurality of generated difference region images. Specifically, the image processing apparatus 100 acquires, as a background image, a plurality of captured images captured at a plurality of timings at which different images are respectively displayed on the display 2002, as in the captured images 2000, 2100, and 2200 in FIGS. 2A to 2C. Then, the image processing apparatus 100 generates a plurality of difference region images by the background difference method using a plurality of background images with respect to the captured image 4000 which is an extraction processing target.

The difference region image generated using the captured image 2000 as a background image and the difference region image generated using the captured image 2100 as a background image are images including the player 5001 and the display surface of the display 2002, as illustrated in FIG. 4C. On the other hand, the difference region image generated using the captured image 2200 as a background image is an image that includes the player 5001 but does not include the display surface of the display 2002, as illustrated in FIG. 4E. Then, the image processing apparatus 100 identifies and extracts a region that is included in all of the plurality of generated difference region images so that the foreground region corresponding to the player 5001 is extracted.

Some embodiments are realizable by a process in which a program for realizing one or more functions of the above-described exemplary embodiment is supplied to a system or apparatus via a network or storage medium and one or more processors of a computer of the system or apparatus read and execute the program. Further, some embodiments are realizable by a circuit (e.g., application-specific integrated circuit (ASIC)) that realizes one or more functions. Further, the program can be recorded on a computer-readable recording medium and provided.

The above-described exemplary embodiment makes it possible to prevent extraction of a region different from a predetermined object that is to be extracted without distinction therebetween based on a difference between a plurality of images captured at a plurality of different timings.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-191754, which was filed on Sep. 29, 2017 and which is hereby incorporated by reference herein in its entirety.

What is claimed is:

1. An image processing apparatus comprising:
one or more memories storing instructions; and
one or more processors executing the instructions to:
obtain an image based on image capturing performed by an image capturing apparatus;
obtain information about an image to be displayed on a display screen of a display apparatus in the obtained image; and
extract an object region included in an extraction target area from which extraction of an object is to be performed, which is included in the obtained image and which does not include an area corresponding to the display screen of the display apparatus in the obtained image,
wherein the obtained information comprises image data to be used to display the image to be displayed on the display screen by the display apparatus.

2. The image processing apparatus according to claim 1, wherein the obtained information is information about a plurality of images to be displayed respectively at a plurality of different timings on the display screen.

3. The image processing apparatus according to claim 1, wherein the information is an image that corresponds to the display screen and is based on image capturing performed at a plurality of timings.

4. The image processing apparatus according to claim 1, wherein the object region is extracted based on a difference between the extraction target area and another image based on the image capturing performed by the image capturing apparatus at a timing different from an image capturing timing at which the extraction target area is captured.

5. The image processing apparatus according to claim 4, wherein the object region is extracted by removing the area corresponding to the display screen from an area in the obtained image which is determined based on the difference between the extraction target area and the area which is included in said another image and which corresponds to the extraction target area.

6. The image processing apparatus according to claim 4,
wherein the area corresponding to the display screen is an area formed by a pixel having a pixel value difference less than a predetermined value from a corresponding pixel in a reference image among pixels included in a predetermined area in the obtained image, and
wherein the object region is a region formed by a pixel that has a pixel value difference greater than or equal to a threshold value from a corresponding pixel in said another image and is not included in the area corresponding to the display screen among pixels of the obtained image.

7. The image processing apparatus according to claim 4, wherein the object region is extracted by determining a difference between a partial image of the extraction target area that is formed by a pixel not included in the area corresponding to the display screen and a region of said another image that corresponds to the partial image.

8. The image processing apparatus according to claim 1, wherein the extraction target area is formed by pixels not included in the area corresponding to the display screen.

9. The image processing apparatus according to claim 1, wherein the object region is a region corresponding to a person.

10. The image processing apparatus according to claim 1, wherein the image to be displayed on the display screen is a moving image that displays a predetermined advertisement.

11. The image processing apparatus according to claim 1, wherein the extracted object region is used for generating a virtual viewpoint image including an object corresponding to the extracted object region.

12. The image processing apparatus according to claim 1, wherein the extracted object region is used for generating three-dimensional shape data on an object corresponding to the extracted object region.

13. The image processing apparatus according to claim 1, wherein the one or more processors further execute the instructions to specify, as an area from which extraction of the object is not to be performed, the area corresponding to the display screen in the obtained image, based on the obtained information.

14. An image processing apparatus comprising:
one or more memories storing instructions; and
one or more processors executing the instructions to:
obtain an image based on image capturing performed by an image capturing apparatus;
obtain information about an image to be displayed on a display screen of a display apparatus in the obtained image; and
extract an object region included in an extraction target area from which extraction of an object is to be performed, which is included in the obtained image and which does not include an area corresponding to the display screen of the display apparatus in the obtained image,
wherein the area corresponding to the display screen is an area formed by a pixel having a pixel value difference less than a predetermined value from a pixel value based on the obtained information among pixels included in a predetermined area in the obtained image.

15. The image processing apparatus according to claim 14, wherein the predetermined area is an area specified based on a difference between a plurality of images based on image capturing performed by the image capturing apparatus at a plurality of different timings.

16. The image processing apparatus according to claim 14, wherein the predetermined area is an area specified based on user designation.

17. An image processing apparatus comprising:
one or more memories storing instructions; and
one or more processors executing the instructions to:
obtain an image based on image capturing performed by an image capturing apparatus;
obtain information about an image to be displayed on a display screen of a display apparatus in the obtained image; and
extract an object region included in an extraction target area from which extraction of an object is to be performed, which is included in the obtained image and which does not include an area corresponding to the display screen of the display apparatus in the obtained image,
wherein the obtained information comprises information indicating a color of the image to be displayed on the display screen.

18. An image processing method comprising:
obtaining an image based on image capturing performed by an image capturing apparatus;
obtaining information about an image to be displayed on a display screen of a display apparatus in the obtained image; and
extracting an object region included in an extraction target area from which extraction of the object is to be performed, which is included in the obtained image and which does not include an area corresponding to the display screen of the display apparatus in the obtained image,
wherein the obtained information comprises image data to be used to display the image to be displayed on the display screen by the display apparatus.

19. A non-transitory computer-readable storage medium configured to store instructions for causing a computer to execute an image processing method comprising:
obtaining an image based on image capturing performed by an image capturing apparatus;
obtaining information about an image to be displayed on a display screen of a display apparatus in the obtained image; and
extracting an object region included in an extraction target area from which extraction of an object is to be performed, which is included in the obtained image and which does not include an area corresponding to the display screen of the display apparatus in the obtained image,
wherein the obtained information comprises image data to be used to display the image to be displayed on the display screen by the display apparatus.

* * * * *